L. GRGEC.
BOLT.
APPLICATION FILED JUNE 24, 1918.
1,301,558.
Patented Apr. 22, 1919.
FIG. 1.
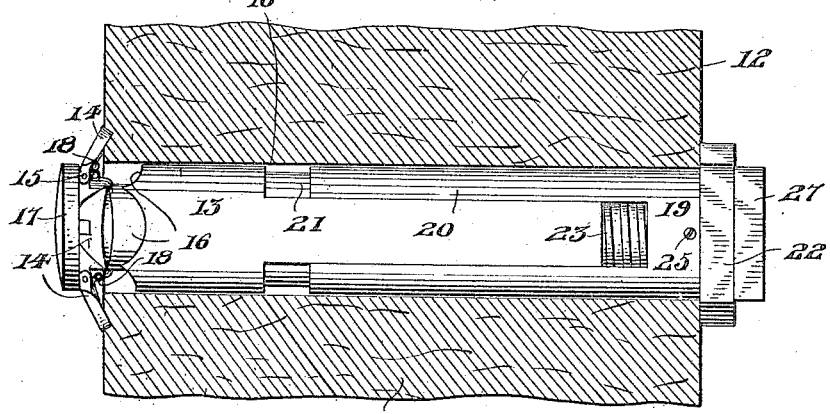
FIG. 2.
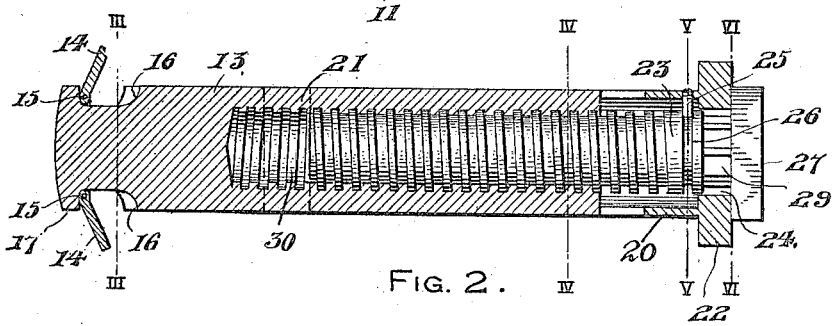
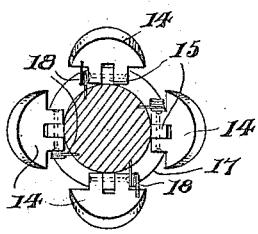
FIG. 3.
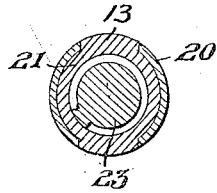
FIG. 4.
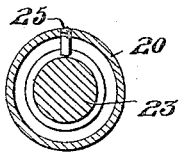
FIG. 5.
FIG. 6.
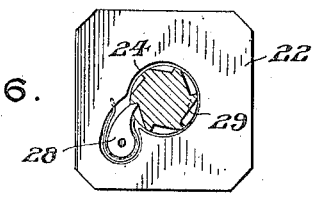
Inventor
L. Grgec
By A. M. Wilson
Attorney

UNITED STATES PATENT OFFICE.

LUKE GRGEC, OF CHICAGO, ILLINOIS.

BOLT.

1,301,558.　　　Specification of Letters Patent.　　Patented Apr. 22, 1919.

Application filed June 24, 1918. Serial No. 241,563.

*To all whom it may concern:*

Be it known that I, LUKE GRGEC, a subject of the King of Hungary, residing at Chicago, in the county of Cook and State of Illinois, have invented certain new and useful Improvements in Bolts, of which the following is a specification.

The primary object of the invention is the provision of a valve locking bolt adapted to be secured through one or more members for any desired purpose, it being impossible to remove the bolt after the same is once locked in its operative position upon the work.

A further object of the invention is to provide a bolt especially adapted for operation in connection with wood, the structure permitting the passing of the bolt through an opening for engaging the opposite side of the work after the manner of a bolt head and preventing the withdrawal of the bolt while locking means are provided at the opposite end of the bolt rendering it impossible to unlock the device without mutilating or destroying the same.

A still further object of the invention is the provision of a bolt having a foldable head member whereby a bolt may be secured through an opening in a member such as a plate where only one side thereof is accessible by the workman, the device being readily locked upon the work and possesses great strength when assembled.

In the drawing forming a part of this application and in which like reference characters designate corresponding parts throughout the several views, Figure 1 is a transverse sectional view through a wooden member such as the side of a boat with my device operatively secured therethrough;

Fig. 2 is a central longitudinal sectional view taken through the device; and

Figs. 3, 4, 5 and 6 are transverse sectional views of the same taken upon lines III—III, IV—IV, V—V, and VI—VI, respectively, of Fig. 2.

My invention consists of a bolt adapted to be secured through an opening such as the opening 10 herein illustrated through the side plate 11 of a boat where only the outer side 12 thereof is accessible to the workman. The cylindrical shank 13 of the bolt is of suitable diameter to be forced through the opening 10 and is provided with a plurality of substantially semi-circular ears 14 hinged as at 15 within correspondingly shaped cutaway portions or sockets 16 in the shank 13 inwardly of a disk shaped terminal head 17. The bolt head 17 is of the same diameter as the shank 13, while the ears 14 are readily placed within the sockets 16 so as to form a substantially unbroken cylindrical surface for the headed end of the shank, permitting the same to be readily forced through the opening 10 when the ears 14 are closed. A spring 18 is provided at each ear 14 for automatically opening the same when the ears 14 are projected through and beyond the end of the opening 10 and whereby the said ears 14 form an auxiliary head preventing the withdrawal of the shank 13 back through the opening 10.

A sleeve 19 having bifurcations or arcuate side sections 20 is longitudinally slidably mounted upon the shank 13, the latter having oppositely positioned reduced or cutaway side portions 21 for receiving the sleeve sections 20, it being understood that the sleeve 19 is of the same diameter as the shank 13. A rectangular head 22 is provided upon the outer free end of the sleeve 19.

A screw 23 is journaled through a perforation 24 in the head 22 and is retained axially within the sleeve 19 by means of a pin 25 carried by the sleeve and extending into an annular groove 26 of the screw 23. The screw 23 may be revolved within the sleeve 19 by means of the squared head 27 upon the outer end of the said screw, while the rotation of the screw is permitted in only one direction by means of a spring pressed dog 28 carried by the sleeve head 22 and engaging the toothed portion 29 of the screw which is positioned within the perforation 24.

The screw 23 is substantially the same length as the sleeve 19 so that upon positioning the side sections 20 of the sleeve within the outer ends of the cutaway portions 21 of the shank 13, the screw 23 may be introduced into the threaded bore 30 of the shank 13. When the shank 13 and sleeve 19 are connected in this manner with the members extended, it will be seen that the disk head 17 of the shank may be moved through the opening 10 of the work 11 with the ears 14 retained folded by engaging the sides of the opening 10. The extended bolt being of much greater length than that of the opening 10, the head 17 and ears 14 may be pushed entirely through the opening permitting the springs 18 to open the ears 14 which will prevent the return movement of the bolt through the opening 10. Upon turning the squared head 17, the screw 23 will be fed into the shank 13 until the head 22 of the sleeve 19 firmly engages the outer side 12 of the work 11. A further rotation of the screw embeds portions of the arcuate outer faces of the ears 14 into the adjacent side of the wooden member 11 and the dog 28 engaging the teeth 29 prevents any return rotation of the screw 23 so that the device is firmly locked upon the work and the entire operation is accomplished from one side such as the outer side 12 of the plate 11. The device may be serviceable for different purposes as for instance the head 22 of the sleeve 19 may be for the purpose of closing the opening 10 in the side of a boat rendering the same water tight.

What I claim as new is:—

1. A bolt comprising a shank having a disk at one end of the same diameter as the shank and further provided with cutaway portions inwardly of the head, substantially semi-circular ears hinged to the shank adjacent the head adapted for seating within said cutaway portions forming a substantially unbroken surface for the shank, automatic projecting means for said ears whereby the latter are normally positioned radially of the shank, the said shank having a threaded axial bore and oppositely reduced portions at the opposite end thereof from said head, a sleeve having arcuate bifurcations slidably mounted upon said reduced portions of the shank with a perforation through the outer end of the sleeve, a screw journaled in said perforation operatively engaging in the bore of the shank, and ratchet connections between the screw and sleeve adapted for preventing a reverse releasing rotation of the screw.

2. A bolt comprising a shank having a disk at one end of the same diameter as the shank and further provided with cutaway portions inwardly of the head, substantially semi-circular ears hinged to the shank adjacent the head adapted for seating within said cutaway portions forming a substantially unbroken surface for the shank, automatic projecting means for said ears whereby the latter are normally positioned radially of the shank, the said shank having a threaded axial bore and oppositely reduced portions at the opposite end thereof from said head, a sleeve having arcuate bifurcations slidably mounted upon said reduced portions of the shank with a perforation through the outer end of the sleeve, a screw journaled in said perforation operatively engaging in the bore of the shank, ratchet connections between the screw and sleeve adapted for preventing a reverse releasing rotation of the screw, a work engaging member upon the outer end of the sleeve, a squared head upon the outer end of the screw outwardly of said work engaging member, and withdrawal preventing connections between the said screw and sleeve.

In testimony whereof I affix my signature.

LUKE GRGEC.

Copies of this patent may be obtained for five cents each, by addressing the "Commissioner of Patents, Washington, D. C."